United States Patent
Nakagawa

(10) Patent No.: US 9,744,883 B2
(45) Date of Patent: Aug. 29, 2017

(54) VEHICLE SEAT

(71) Applicant: TOYOTA BOSHOKU KABUSHIKI KAISHA, Aichi-ken (JP)

(72) Inventor: Tetsuo Nakagawa, Aichi-Ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/222,156

(22) Filed: Jul. 28, 2016

(65) Prior Publication Data
US 2017/0028878 A1 Feb. 2, 2017

(30) Foreign Application Priority Data
Jul. 31, 2015 (JP) .................. 2015-151677

(51) Int. Cl.
*B60N 2/44* (2006.01)
*B60N 2/68* (2006.01)
*B60N 2/16* (2006.01)

(52) U.S. Cl.
CPC ........ *B60N 2/16* (2013.01); *B60N 2/44* (2013.01)

(58) Field of Classification Search
CPC ................................ B60N 2/16; B60N 2/44
USPC ............................................ 297/463.1, 463.2
See application file for complete search history.

(56) References Cited

U.S. PATENT DOCUMENTS

| 3,957,312 | A | * | 5/1976 | Bonnaud | B60N 2/12 248/424 |
| 4,248,479 | A | * | 2/1981 | Toda | B60N 2/2209 297/342 |
| 4,653,807 | A | * | 3/1987 | Hirose | B60N 2/2352 248/430 |
| 4,740,035 | A | * | 4/1988 | Kazaoka | B60N 2/66 297/218.1 |
| 4,786,109 | A | * | 11/1988 | Toya | B60N 2/44 297/463.1 X |
| 4,850,644 | A | * | 7/1989 | Kazaoka | B60N 2/0715 297/325 |
| 4,973,105 | A | * | 11/1990 | Itou | B60N 2/161 297/463.1 X |
| 5,288,133 | A | * | 2/1994 | Mizushima | B60N 2/0705 297/463.2 X |
| 5,529,376 | A | * | 6/1996 | Jovan | B60N 2/015 297/463.1 X |
| 5,618,059 | A | * | 4/1997 | Kim | B60R 22/28 297/463.1 X |

(Continued)

FOREIGN PATENT DOCUMENTS

JP 2014-227136 12/2014

*Primary Examiner* — Rodney B White
(74) *Attorney, Agent, or Firm* — Greenblum & Bernstein, P.L.C.

(57) ABSTRACT

A vehicle seat includes: a seat cushion; an operating member; a shield having an opening through which the operating member is passed; and a cover member provided in the opening so as to cover part of the opening while permitting the rotation operation of the operating member. The operating member has a protrusion projecting toward the shield, in a part opposed to the shield. Either one of the cover member and the shield is formed as a projecting portion projecting toward the protrusion. The operating member is configured such that the protrusion slides on the projecting portion while abutting with the projecting portion when the rotation operation is performed on the operating member.

4 Claims, 8 Drawing Sheets

(56) References Cited

U.S. PATENT DOCUMENTS

| | | | | |
|---|---|---|---|---|
| 5,772,283 A * | 6/1998 | Yoshida | B60N 2/0292 | 297/463.1 X |
| 5,879,055 A * | 3/1999 | Dishner | B60N 2/0715 | 297/218.3 |
| 6,149,241 A * | 11/2000 | Waku | B60N 2/015 | 297/463.2 X |
| 6,585,321 B1 * | 7/2003 | Taguchi | B60N 2/0712 | 297/344.1 |
| 6,588,850 B2 * | 7/2003 | Matsuo | B60N 2/071 | 297/463.1 X |
| 7,472,963 B2 * | 1/2009 | Jeong | B60N 2/0296 | 297/463.1 |
| 7,862,121 B2 * | 1/2011 | Ishijima | B60N 2/0296 | 297/367 R |
| 8,162,404 B2 * | 4/2012 | Ueda | B60N 2/0296 | 297/463.1 X |
| 8,353,561 B2 * | 1/2013 | Yamazaki | B60N 2/44 | 297/463.1 X |
| 8,678,507 B2 * | 3/2014 | Yamazaki | B60N 2/44 | 297/463.1 X |
| 8,708,419 B2 * | 4/2014 | Shimamura | B60N 2/0705 | 297/463.1 |
| 8,960,803 B2 * | 2/2015 | Mita | B60N 2/22 | 297/463.1 X |
| 9,022,477 B2 * | 5/2015 | Pleskot | B60N 2/06 | 297/463.1 X |
| 9,132,752 B2 * | 9/2015 | Pleskot | B60N 2/6009 | |
| 9,216,667 B1 * | 12/2015 | Izawa | B60N 2/167 | |
| 9,580,001 B2 * | 2/2017 | Sosnowski | B60N 2/58 | |
| 9,630,528 B2 * | 4/2017 | Takei | B60N 2/6009 | |
| 2002/0050730 A1 * | 5/2002 | Kondo | B60N 2/002 | 297/217.3 |
| 2009/0026791 A1 * | 1/2009 | Ishijima | B60N 2/0296 | 297/361.1 X |
| 2009/0026825 A1 * | 1/2009 | Ishijima | B60N 2/0296 | 297/358 |
| 2009/0051202 A1 * | 2/2009 | Ozeki | B60N 2/20 | 297/341 |
| 2009/0058158 A1 * | 3/2009 | Sobieski | B60N 2/0296 | 297/463.1 X |
| 2009/0267397 A1 * | 10/2009 | Kubota | B60N 2/169 | 297/344.15 |
| 2010/0109406 A1 * | 5/2010 | Ueda | B60N 2/0296 | 297/358 |
| 2012/0313408 A1 * | 12/2012 | Nagata | B60N 2/4235 | 297/463.1 X |
| 2017/0028883 A1 * | 2/2017 | Kasuga | B60N 2/44 | |
| 2017/0028942 A1 * | 2/2017 | Nakagawa | B60N 2/44 | |
| 2017/0028943 A1 * | 2/2017 | Nakagawa | B60N 2/6009 | |

* cited by examiner

VEHICLE SEAT

INCORPORATION BY REFERENCE

The disclosure of Japanese Patent Application No. 2015-151677 filed on Jul. 31, 2016 including the specification, drawings and abstract is incorporated herein by reference in its entirety.

BACKGROUND OF THE INVENTION

1. Field of the Invention

The present invention relates to a vehicle seat.

2. Description of Related Art

There has been known a vehicle seat configured such that a lever-shaped operating member and a shield are disposed on a side face portion of a seat cushion. The lever-shaped operating member can be operated to rotate around a shaft extending in a vertical direction with respect to the side face portion. In the invention disclosed in Japanese Patent Application Publication No. 2014-227136 (JP 2014-227136 A), the shaft penetrates through the shield so as to extend outside, and the whole operating member is exposed outside the shield. A roller that can roll over the shield is attached to a part opposed to the shield in a distal-end-side portion of the operating member. The distal-end-side portion is a part of the operating member on a side distanced from the shaft. When the operating member is operated to rotate, the roller abuts on the shield and rolls. Accordingly, a separation dimension between the distal-end-side portion and the shield is maintained, thereby restraining wobbling of the distal-end-side portion with respect to the shield.

SUMMARY OF THE INVENTION

In the invention disclosed in JP 2014-227136 A, since the roller is provided, the number of components is increased by just that much and a structure of the operating member becomes complicated, which may decrease productivity. In order to solve this problem, the following structure is conceivable. That is, a protrusion projecting toward a shield is provided in a part opposed to the shield in a distal-end-side portion of an operating member, and a bead projecting toward the protrusion is provided in the shield such that the protrusion is slidable while abutting with the bead when the operating member is operated to rotate. In this structure, part of the bead may not be covered with the distal-end-side portion, but may appear on an appearance as a line.

For a request in the design to make the operating member look small, a base-end-side portion of the operating member may be covered with the shield. The base-end-side portion is a part of the operating member on a side close to the shaft. At this time, the shield has an opening that covers the base-end-side portion of the operating member in a rotation operation range of the operating member and passes the operating member therethrough so as to expose the distal-end-side portion of the operating member outside, and a cover member is attached to the opening so as to close part of the opening while permitting a rotation operation of the operating member. In such a structure, a boundary portion between the shield and the cover member appears on the appearance as a line. In such a configuration, when the bead is provided in the shield, not only the line of the boundary portion between the shield and the cover member but also the line of the bead appear on the appearance. This results in that the number of lines increases, which may deteriorate an outward appearance.

The present invention provides a vehicle seat in which a base-end-side portion of an operating member is covered with a shield, and the vehicle seat is able to restrain wobbling of a distal-end-side portion with respect to the shield when the operating member is operated to rotate and to restrain a deterioration in an outward appearance.

A vehicle seat according to an aspect of the present invention includes: a seat cushion; an operating member provided in a side face portion of the seat cushion, the operating member being formed in a lever shape on which a rotation operation is performable around an axis extending in a vertical direction with respect to the side face portion; a shield configured to cover a base-end-side portion in a rotation operation range of the operating member, the base-end-side portion being a part of the operating member on a side close to the axis of the operating member, the shield having an opening through which the operating member is passed so as to expose a distal-end-side portion outside, the distal-end-side portion being a part of the operating member on a distant side from the axis; and a cover member provided in the opening so as to close part of the opening while permitting the rotation operation of the operating member. The operating member has a protrusion projecting toward the shield and the protrusion is provided in a part opposed to the shield in the distal-end-side potion. Either one of the cover member and the shield is formed as a projecting portion projecting toward the protrusion in a part of a boundary portion between the cover member and the shield, the part of the boundary portion corresponding to the rotation operation range of the operating member. The operating member is configured such that the protrusion slides on the projecting portion while abutting with the projecting portion when the rotation operation is performed on the operating member.

According to the above aspect, in the part of the boundary portion corresponding to the rotation operation range of the operating member in the boundary portion between the cover member and the shield, either of the cover member and the shield is formed as the projecting portion projecting toward the protrusion provided in the distal-end-side portion of the operating member. When the operating member is operated to rotate, the protrusion is configured to slide on the projecting portion while abutting therewith. This makes it possible to restrain wobbling of the distal-end-side portion with respect to the shield when the operating member is operated to rotate. Further, when the cover member is attached to the opening provided in the shield, the projecting portion functions like a bead, so it is unnecessary to provide the bead or the like. On this account, a line appearing on an appearance is only a line of the boundary portion between the cover member and the shield, and a line appearing when the bead or the like is provided is not added. This makes it possible to restrain an increase in the number of lines to appear on the appearance, thereby making it possible to restrain a deterioration in an outward appearance.

In the above aspect, the protrusion may extend in a radial direction of the axis, and the operating member may be configured such that at least part of the protrusion abuts on the projecting portion when the rotation operation is performed on the operating member.

According to the above configuration, even if the projecting portion is formed so as to extend in a curved shape slightly deviating from an arc around the axis, it is possible to maintain a state where the protrusion slides on the projecting portion while abutting therewith when the operating member is operated to rotate.

In the above aspect, the operating member may be a lifter lever configured to adjust a height position of the seat cushion with respect to a floor.

According to the above configuration, it is possible to restrain wobbling of the distal-end-side portion with respect to the shield when the lifter lever is operated to rotate, and to restrain a deterioration in an outward appearance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

FIGS. 1 to 8 illustrate one embodiment of the present invention. The present embodiment is an example in which the present invention is applied to a seat cushion, which is a seat portion of a vehicle seat. In each of the figures, each direction of an automobile at a time when the vehicle seat is attached to the automobile is indicated by an arrow. In the following description, a description related to a direction shall be made on the basis of this direction.

Figure 1:
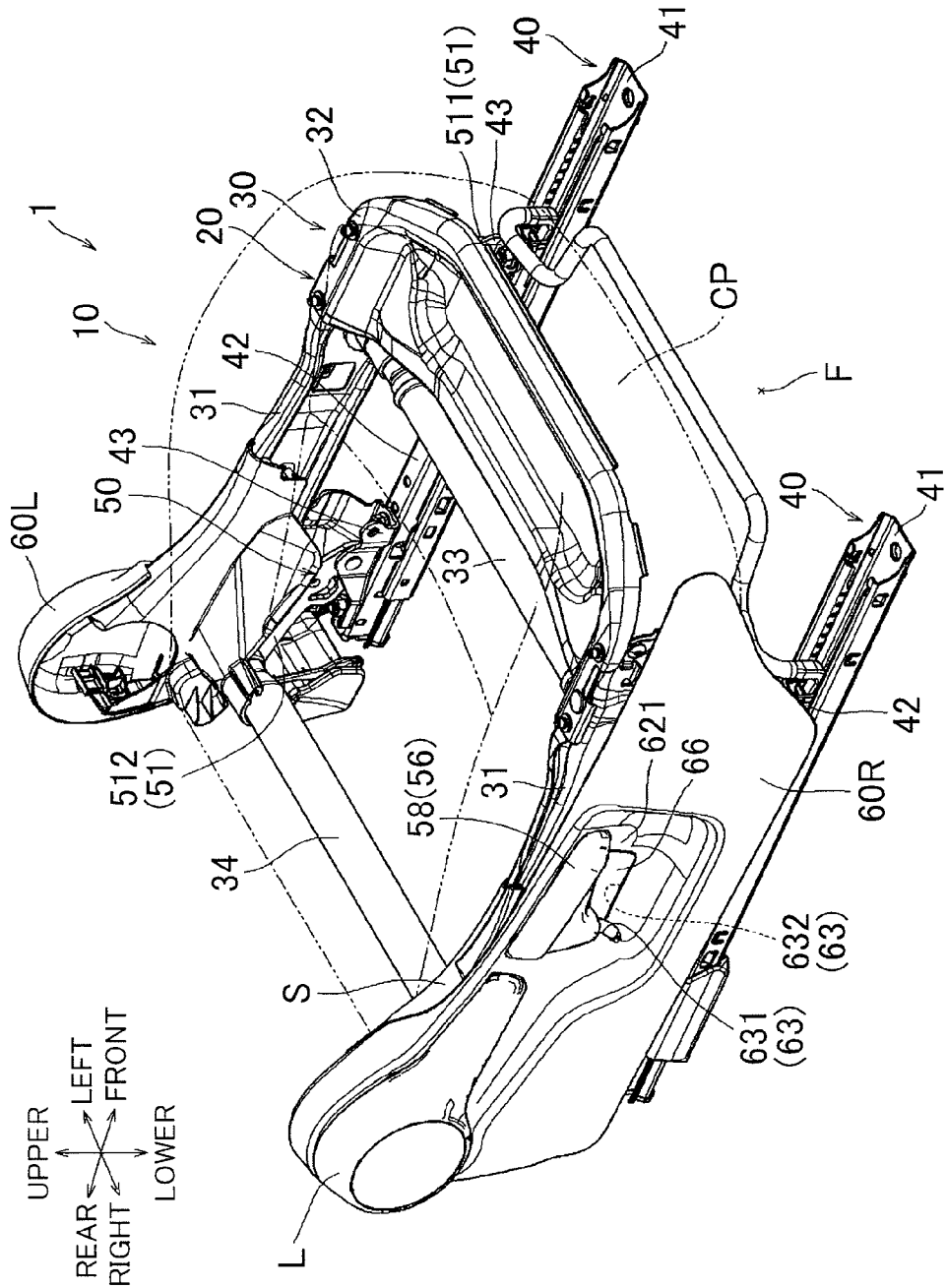
FIG. 1 is a perspective view of a seat cushion of a vehicle seat according to one embodiment of the present invention.

As illustrated in FIG. 1, a seat cushion 10 of a vehicle seat 1 is configured such that a cushion pad CP, which is a cushioning material, is placed on a metal cushion frame 20 forming a framework, and then covered with a cushion cover (not illustrated) from above. A shield 60R is disposed on a right side face portion of the seat cushion 10, and a shield 60L is disposed on a left side face portion thereof. Since the cushion pad CP and the shield 60L have well-known configurations, descriptions thereof are omitted. The following describes the cushion frame 20 and the shield 60R.

As illustrated in FIG. 1, the cushion frame 20 is constituted by a frame body portion 30, a slide rail 40, and a lifter mechanism 50.

Figure 3:
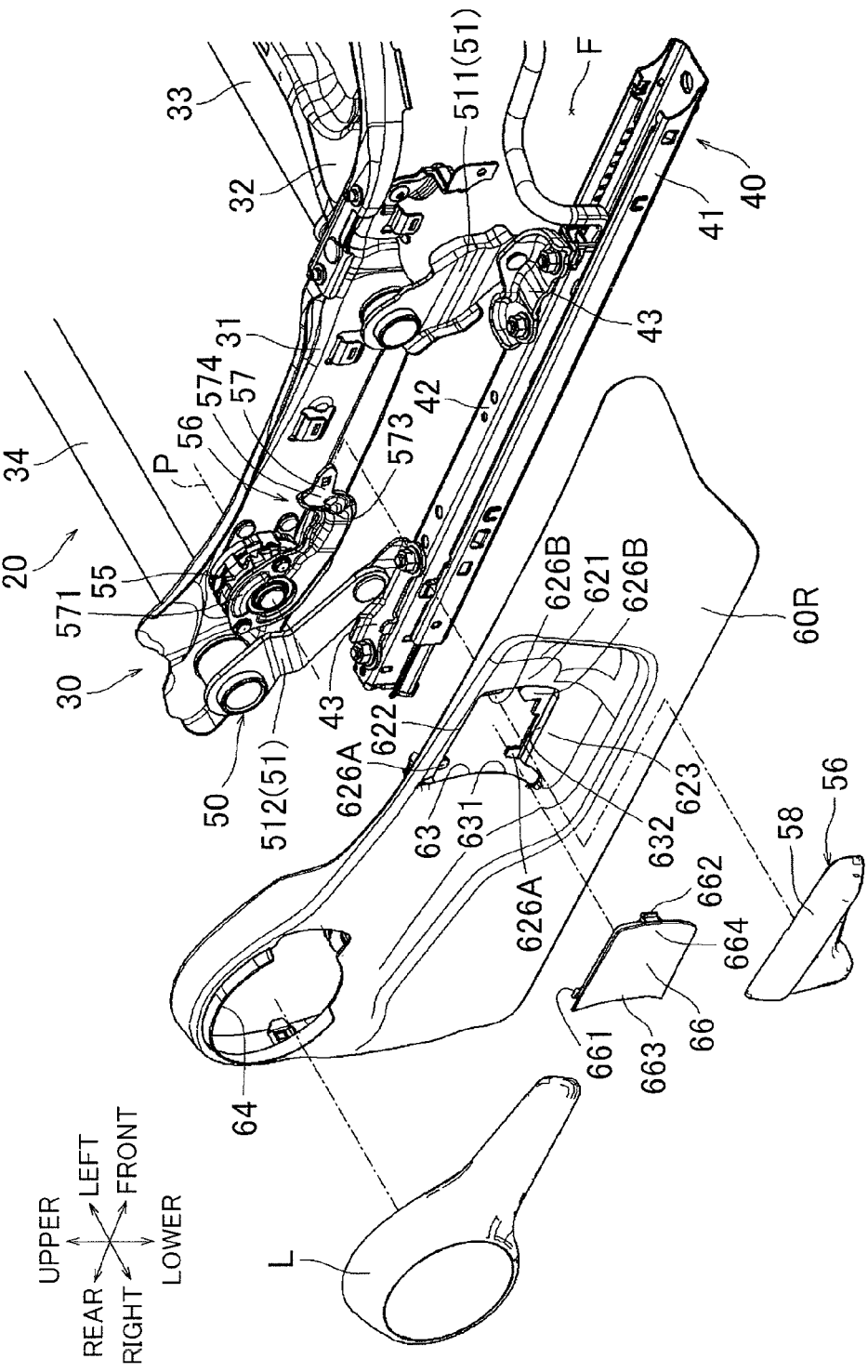
FIG. 3 is an exploded perspective view of a right side face portion of the seat cushion according to the embodiment.
Figure 4:
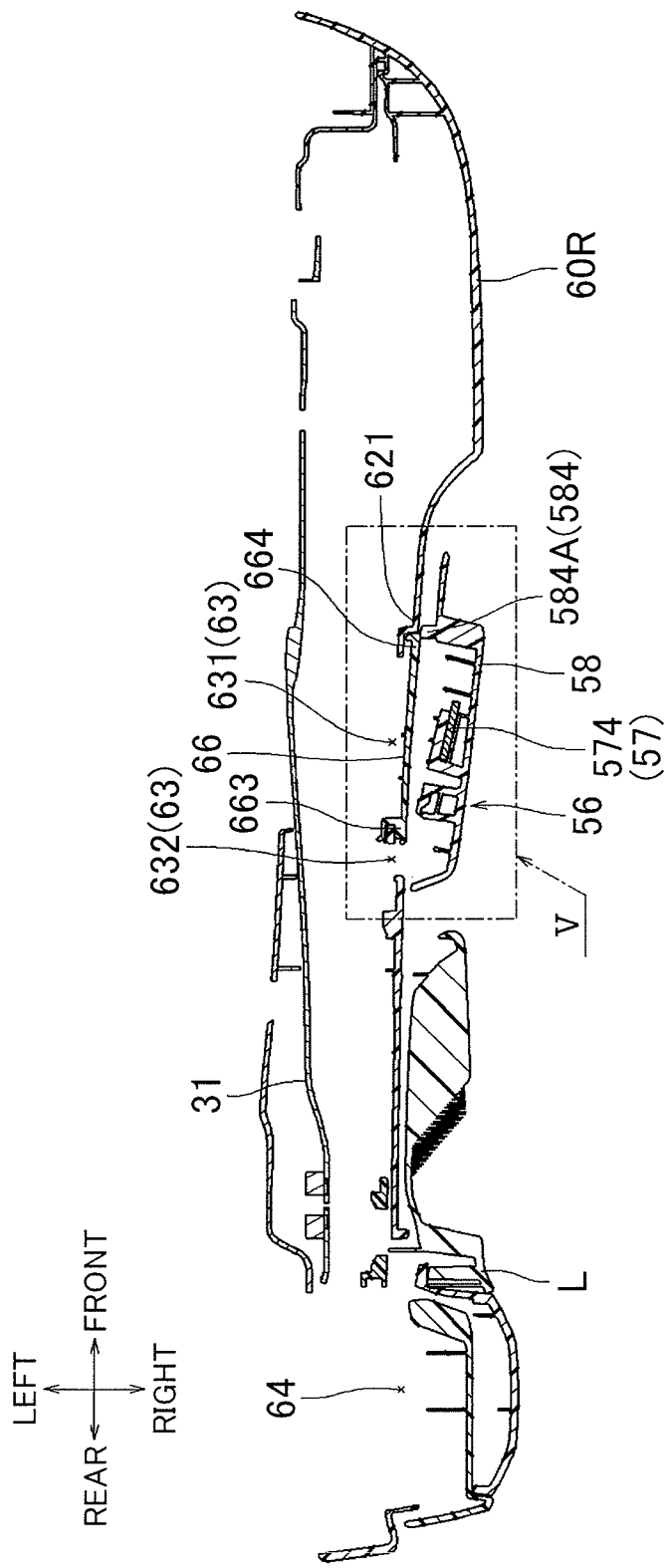
FIG. 4 is a sectional view taken along an arrow IV-IV in FIG. 2, and is a view enlarging only the vicinity of the right side face portion of the seat cushion.

As illustrated in FIGS. 1 and 3, the frame body portion 30 is a structure formed in a generally square-frame shape in a top view, and includes: two side frames 31 on right and left sides; a front panel 32 connecting respective front ends of the side frames 31; a front pipe 33 extending in a right-left direction between the side frames 31 at a position on a slightly rear side relative to the front panel 32 and provided in a bridging manner between the side frames 31 so as to be attached thereto; and a rear pipe 34 extending in the right-left direction between rear ends of the side frames 31 and provided in a bridging manner therebetween so as to be attached thereto. The front pipe 33 and the rear pipe 34 are attached to the side frames 31 in a rotatable manner. An upper end of the after-mentioned lifter link 51 of the lifter mechanism 50 is attached to right and left ends of the front pipe 33 and the rear pipe 34 in a non-rotatable manner relative to the front pipe 33 and the rear pipe 34. Further, upper sides of rear ends of the side frames 31 are connected to a lower end of a seatback (not shown), which is a backrest portion of the vehicle seat 1, via a recliner (not shown). This allows the seatback to adjust its inclination angle relative to the seat cushion 10.

As illustrated in FIGS. 1 and 3, the slide rail 40 includes a lower rail 41 fixed to a floor F and extending in a front-rear direction, and an upper rail 42 slidably assembled to the lower rail 41. Brackets 43 are attached to an upper face portion of the upper rail 42, at two places on front and back sides. A lower end of the after-mentioned lifter link 51 of the lifter mechanism 50 is supported by the bracket 43 in a rotatable manner in the front-rear direction. That is, the side frame 31 of the frame body portion 30 is connected to the slide rail 40 via the lifter link 51.

As illustrated in FIGS. 1 and 3, the lifter mechanism 50 is mainly constituted by the lifter link 51, the front pipe 33 and the rear pipe 34 of the frame body portion 30, and a brake mechanism 55. The lifter link 51 includes: two front links 511 on the right and left sides of a front side; and two rear links 512 on the right and left sides of a rear side. As described above, an upper end of the front link 511 is connected to the front pipe 33 in a non-rotatable manner relative to the front pipe 33, and a lower end thereof is supported by the bracket 43 in a rotatable manner in the front-rear direction. An upper end of the rear link 512 is connected to the rear pipe 34 in a non-rotatable manner relative to the rear pipe 34, and a lower end thereof is supported by the bracket 43 in a rotatable manner in the front-rear direction. A sector gear (not shown) is attached to the rear pipe 34 in a non-rotatable manner relative to the rear pipe 34, in the vicinity of a left face portion of the right side frame 31. The sector gear is engaged with a pinion gear (not shown) of a brake mechanism 55 attached to the right side frame 31. In FIG. 3, an axis P as a rotation center of the pinion gear of the brake mechanism 55 is illustrated. When the pinion gear of the brake mechanism 55 rotates around the axis P, the sector gear rotates and the rear pipe 34 rotates. When the rear pipe 34 rotates, the rear link 512 is to rotate in the front-rear direction around the rear pipe 34, so the rear link 512 swings back and forth in synchronization with the front link 511. Hereby, a height position of the frame body portion 30 with respect to the floor F is adjustable.

Figure 2:
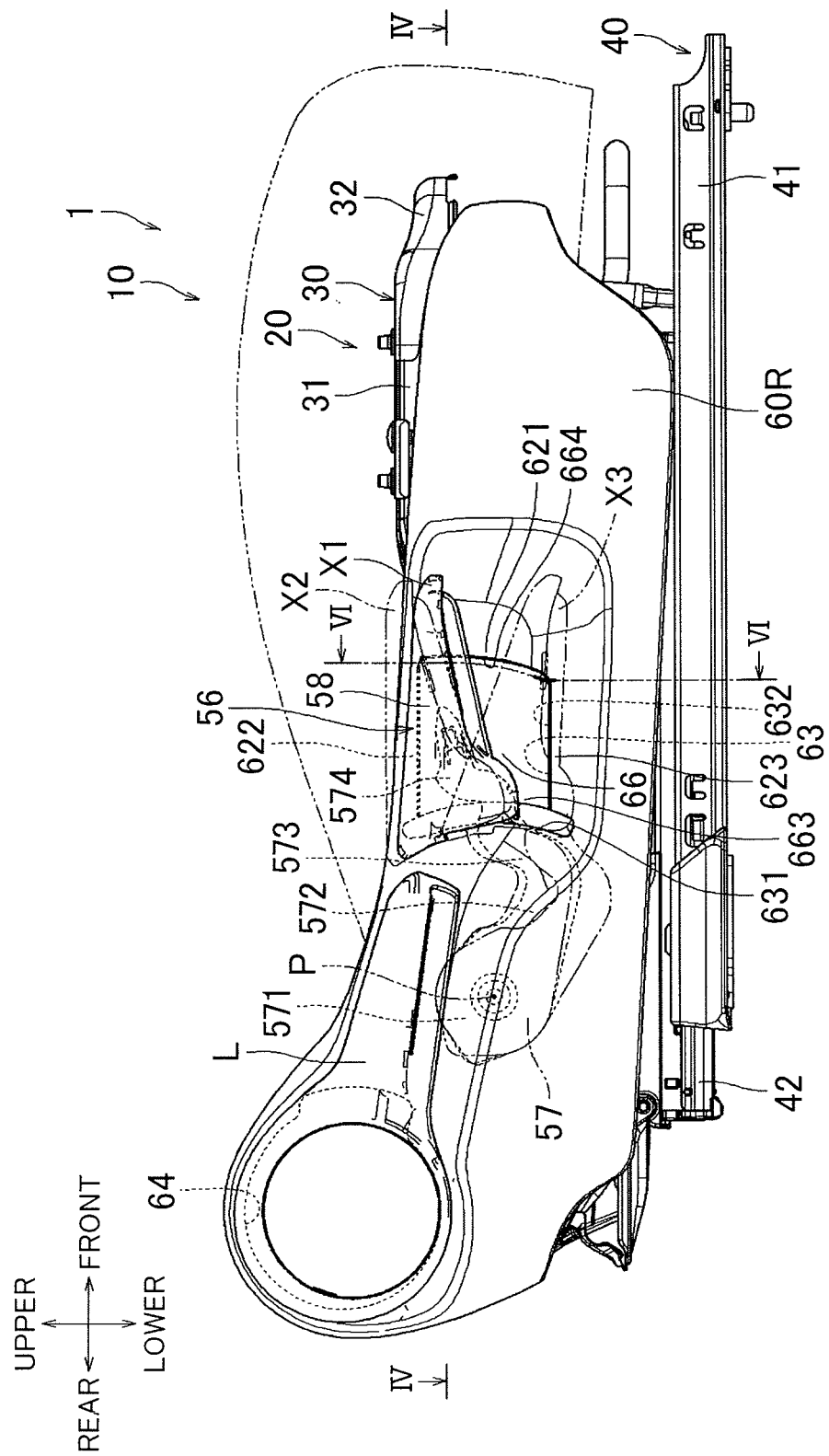
FIG. 2 is a right side view in FIG. 1.

The shield 60R is a so-called outer shield and mainly covers the right side frame 31 from the right side. Note that a description about a so-called inner shield S (see FIG. 1) that covers a rear end of the right side frame 31 from the left side is omitted. As illustrated in FIG. 3, the shield 60R extends in the front-rear direction, and a lifter-lever attachment hole 63 is formed in a penetrating manner in a central part thereof in the front-rear direction. The lifter-lever attachment hole 63 is in a generally lateral hat shape, and is constituted by a long hole portion 631 extending in an up-down direction, and a square hole portion 632 extending forward continuously from a central part of the long hole portion 631 in the up-down direction. The long hole portion 631 extends so as to be curved forward in a projecting manner. More specifically, as illustrated in FIG. 2, the long hole portion 631 extends along an arc around the axis P so as to permit a movement of a bilaterally extending portion 573 of the after-mentioned lifter lever 56, when the shield 60R is attached to the right side face portion of the seat cushion 10. The square hole portion 632 is opened in a generally rectangular shape. More specifically, when the shield 60R is attached to the right side face portion of the seat cushion 10, the square hole portion 632 is opened with an area that allows a second anteroposterior extending portion 574 of the after-mentioned lifter lever 56 to be passed therethrough so as to be positioned on the right side relative to the shield 60R. That is, when the square hole portion 632 is provided in the shield 60R, a first anteroposterior extending portion 572 of the lifter lever 56 is covered with the shield 60R, and can position the second anteroposterior extending portion 574 of the lifter lever 56 outside the shield 60R. A front end of the square hole portion 632 extends so as to be curved forward in a projecting manner, but the front end extends in a curved manner slightly deviating from an arc around the axis P. That is, a front edge portion 621 also extends in a curved manner slightly deviating from an arc around the axis P. The front edge portion 621 is an edge portion of the shield 60R and positioned in front of the front end of the square hole portion 632. The lifter-lever attachment hole 63 is an example of an "opening" in Claims.

Figure 5:
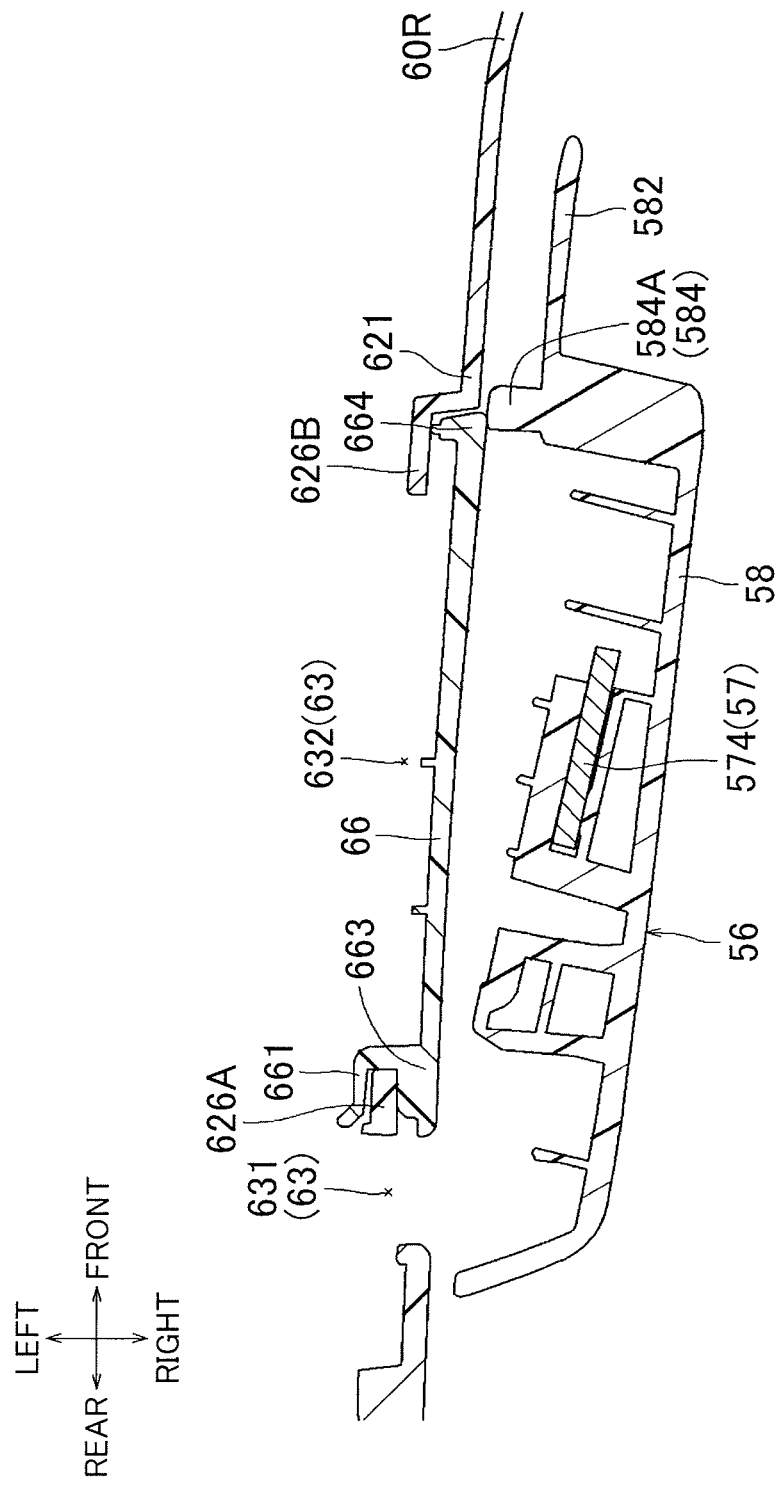
FIG. 5 is an enlarged view of a part V in FIG. 4.
Figure 6:
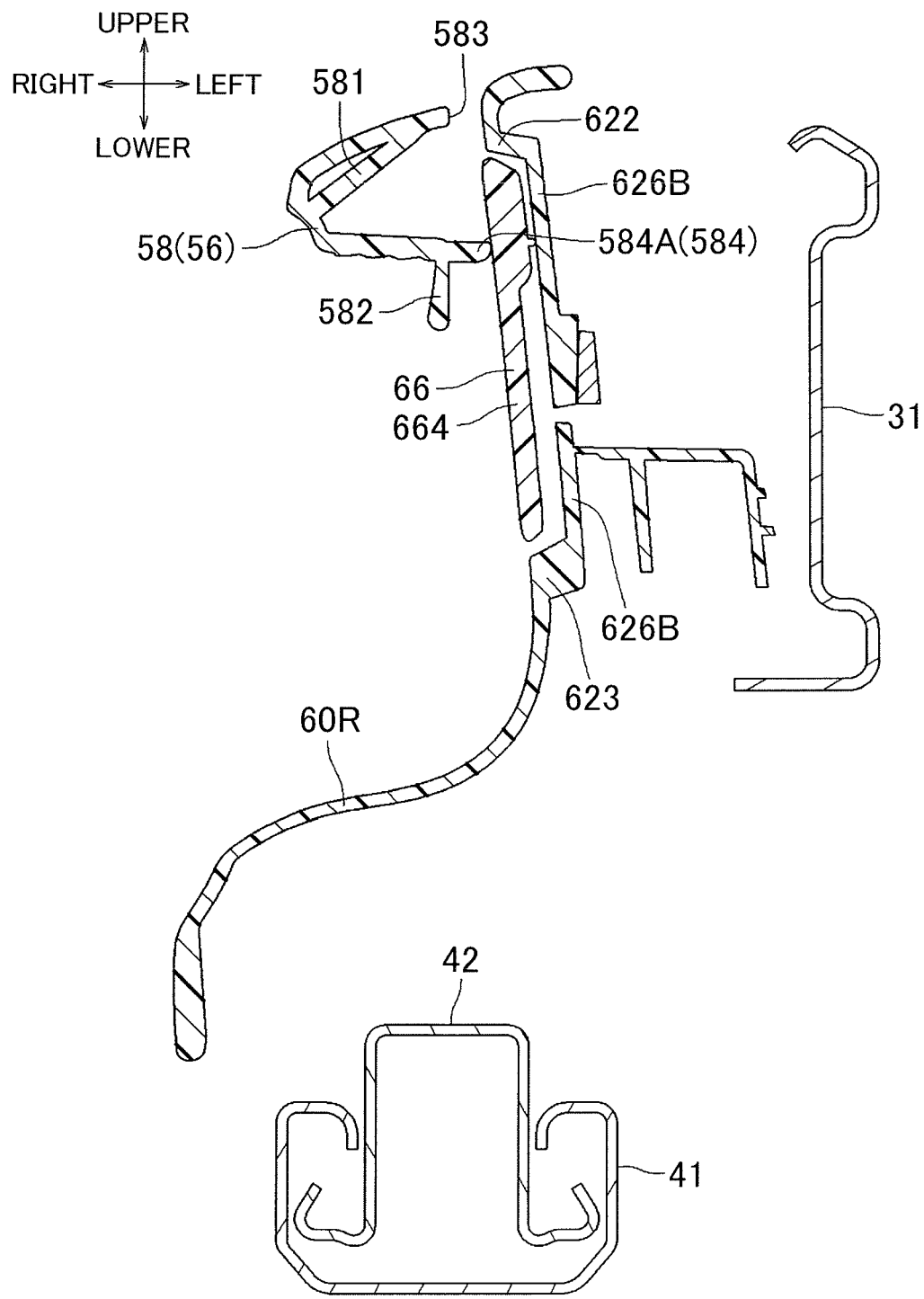
FIG. 6 is a sectional view taken along an arrow VI-VI in FIG. 2, and is a view enlarging only the vicinity of the right side face portion of the seat cushion.

As illustrated in FIGS. 3 and 5, a rear left end of an upper edge portion 622 and a rear left end of a lower edge portion 623 each have one first flange portion 626A having a rectangular and thin plate shape and extending downward or upward therefrom. The upper edge portion 622 is an edge portion of the shield 60R and positioned above the upper end of the square hole portion 632, and the lower edge portion 623 is an edge portion of the shield 60R and positioned below a lower end of the square hole portion 632. As illustrated in FIGS. 3, 5, 6, front left ends of the upper edge portion 622 and the lower edge portion 623 each have one second flange portion 626B having a thin plate shape extending therefrom in a generally L-shape over the front edge portion 621.

A recliner-lever attachment hole 64 is formed in a penetrating manner in a rear part of the shield 60R. The recliner-lever attachment hole 64 is a through-hole through which a recliner lever L is passed. The recliner lever L is an operating member of a recliner.

As illustrated in FIGS. 2 and 3, the cover member 66 is a generally rectangular planar member, and is configured to be attached to the lifter-lever attachment hole 63 so as to cover a whole area of the square hole portion 632. A rear edge portion 663 of the cover member 66 has a rear engaging pawl 661 that is engageable with the first flange portions 626A of the shield 60R. A front edge portion 664 of the cover member 66 has a front engaging pawl 662 that is engageable with a central part of the front edge portion 621 of the shield 60R in the up-down direction. As illustrated in FIG. 5, when the cover member 66 is attached to the lifter-lever attachment hole 63, the rear edge portion 663 of the cover member 66 is supported by the first flange portions 626A from the left side, and the front edge portion 664 of the cover member 66 is supported by the second flange portions 626B from the left side. At this time, a part of the cover member 66 from the rear edge portion 663 to the central part thereof in the front-rear direction is flush with the shield 60R. Here, since the cover member 66 is formed to gradually increase in thickness from the central part in the front-rear direction toward the front edge portion 664, the front edge portion 664 of the cover member 66 projects rightward relative to the front edge portion 621 of the shield 60R. The front edge portion 664 of the cover member 66 is an example of a "projecting portion" in Claims.

The lifter lever 56 is an operating member of the lifter mechanism 50, and as illustrated in FIG. 2, the lifter lever 56 is provided rotatably together with the pinion gear of the brake mechanism 55 around the axis P. The lifter lever 56 includes a lever main body 57 made of metal, and a gripper 58 made of resin. The lifter lever 56 is an example of an "operating member" in Claims.

Figure 7:
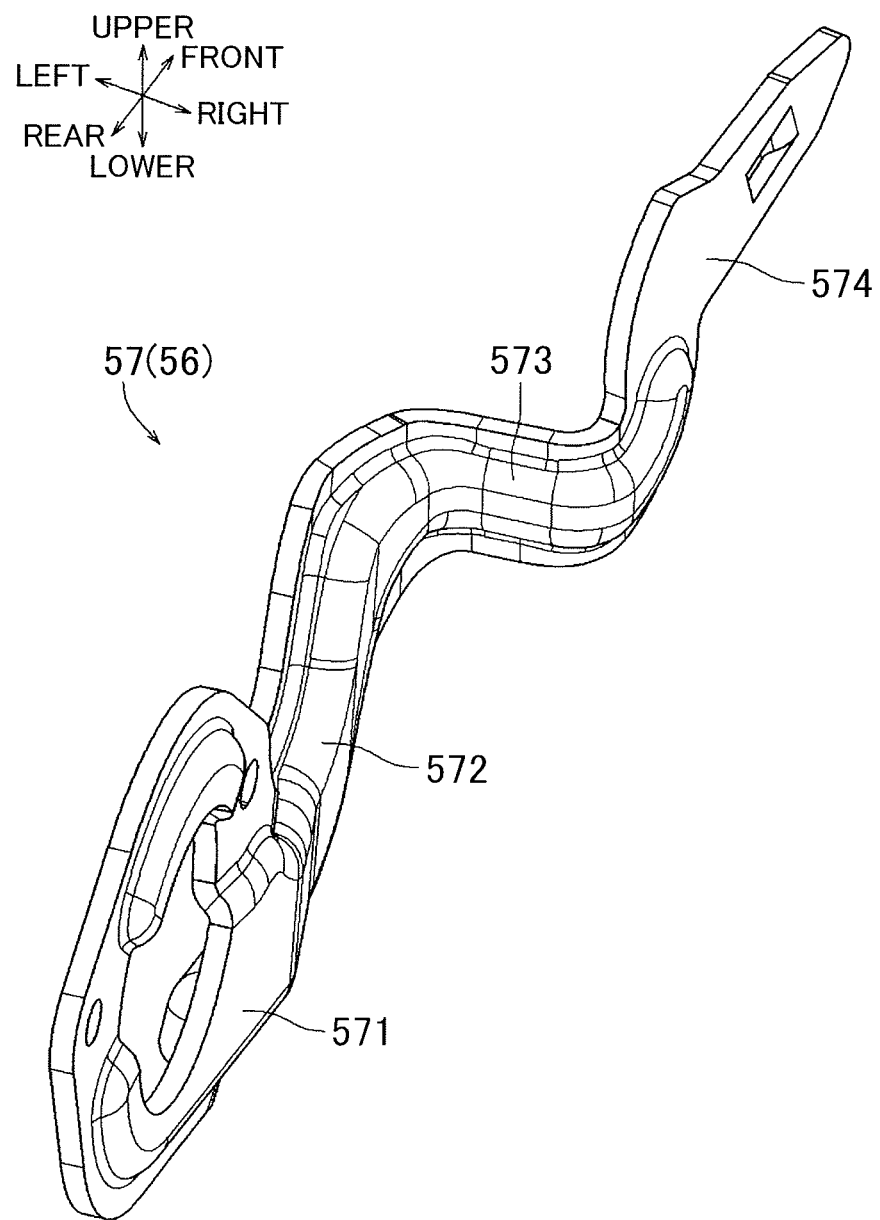
FIG. 7 is a perspective view of a lever main body of a lifter lever according to the embodiment, when viewed from above a diagonally backward right side.

As illustrated in FIG. 7, the lever main body 57 has a crank shape in which its intermediate part in the front-rear direction is bent once rightward and then extended forward. That is, the lever main body 57 is constituted by a base end 571 connected to the brake mechanism 55, a first anteroposterior extending portion 572 extending forward from the base end 571, a bilaterally extending portion 573 extending from a front end of the first anteroposterior extending portion 572 toward a right front side, and a second anteroposterior extending portion 574 extending forward from a right end of the bilaterally extending portion 573. The base end 571 and the first anteroposterior extending portion 572 are an example of a "base-end-side portion" in Claims.

Figure 8:
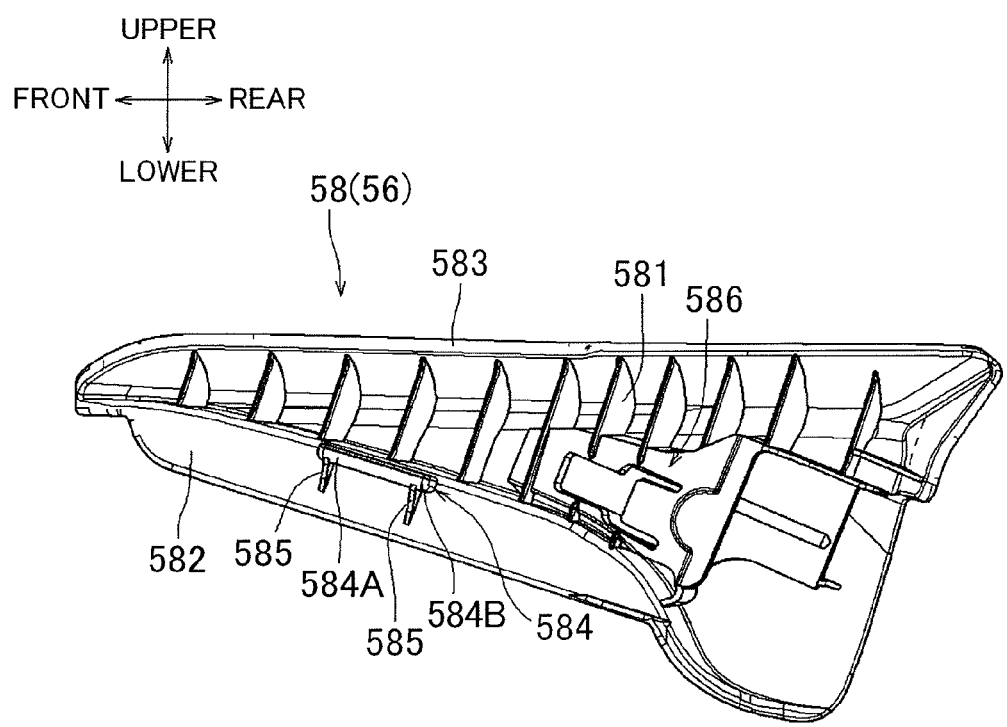
FIG. 8 is a left side view of a gripper of the lifter lever according the embodiment.

As illustrated in FIGS. 6 and 8, the gripper 58 is formed in a generally bowl shape opened on the left side and has a rib 581 formed inside the bowl shape to secure rigidity. A flange portion 582 extending downward is formed in a lower end of a left edge portion 583 of the gripper 58. A protrusion 584 projecting leftward relative to the flange portion 582 is formed in the vicinity of a central part, in the front-rear direction, of a left surface of the flange portion 582. The protrusion 584 is a ridge extended generally in the front-rear direction (a radial direction of the axis P), and its section cut by a plane perpendicular to its extending direction has a generally quadrant shape rounded toward a lower left side. A length of the protrusion 584 in the front-rear direction is a length that maintains an abutment state between the protrusion 584 and the front edge portion 664 of the cover member 66 when the lifter lever 56 is operated to rotate between a lower limit position and an upper limit position. As illustrated in FIG. 8, the flange portion 582 includes brace-shaped support portions 585 formed in a part corresponding to a front part 584A of the protrusion 584 and in a part corresponding to a rear part 584B thereof. The support portions 585 support the protrusion 584 from a lower side. A latched portion 586 that can be locked to the second anteroposterior extending portion 574 of the lever main body 57 is formed in a rear part of the gripper 58. The second anteroposterior extending portion 574 of the lever main body 57 and the gripper 58 are an example of a "distal-end-side portion" in Claims.

Based on FIG. 3, the following describes a procedure of disposing the shield 60R and the cover member 66 in the right side face portion of the seat cushion 10. First, in a state where the base end 571 of the lever main body 57 is attached to the brake mechanism 55, the shield 60R is attached to the right side frame 31 from the right side. At this time, the second anteroposterior extending portion 574 of the lever main body 57 is passed through the square hole portion 632 of the lifter-lever attachment hole 63, and the bilaterally extending portion 573 of the lever main body 57 is passed through the long hole portion 631 of the lifter-lever attachment hole 63. Hereby, the second anteroposterior extending portion 574 of the lever main body 57 is placed outside the shield 60R through the square hole portion 632. Then, the cover member 66 is fitted to the square hole portion 632. More specifically, the cover member 66 is inserted between the second anteroposterior extending portion 574 of the lever main body 57 and the shield 60R, and then, the rear engaging pawl 661 of the cover member 66 is locked to the first flange portions 626A of the shield 60R. The front engaging pawl 662 of the cover member 66 is locked to the front edge portion 621 of the shield 60R. After that, the latched portion 586 of the gripper 58 is passed through the second anteroposterior extending portion 574 of the lever main body 57 so as to be locked thereto. At this time, the protrusion 584 of the gripper 58 abuts on the front edge portion 664 of the cover member 66.

When the lifter lever 56 is not operated, the lifter lever 56 is in a normal state X1 indicated by a continuous line in FIG. 2. At this time, only the front part 584A of the protrusion 584 abuts on the front edge portion 664 of the cover member 66. When a sitting person sitting on the seat cushion 10 grips the gripper 58 and pulls the gripper 58 upward, the lifter lever 56 is in a state X2 where the lifter lever 56 is pulled upward from the normal state X1. At this time, only the front part 584A of the protrusion 584 abuts on the front edge portion 664 of the cover member 66, similarly. That is, when the lifter lever 56 is operated to rotate between the normal state X1 and the state X2 where the lifter lever 56 is pulled upward from the normal state X1, the front part 584A of the protrusion 584 slides on the front edge portion 664 of the cover member 66. Further, when the sitting person grips the gripper 58 and pulls the gripper 58 downward, the lifter lever 56 is in a state X3 where the lifter lever 56 is pulled downward from the normal state X1. At this time, only the rear part 584B of the protrusion 584 abuts on the front edge portion 664 of the cover member 66. That is, when the lifter lever 56 is operated to rotate between the normal state X1 and the state X3 where the lifter lever 56 is pulled downward from the normal state X1, a part of the protrusion 584 from the front part 584A to the rear part 584B slides on the front edge portion 664 of the cover member 66.

The present embodiment thus configured has the following effects. The front edge portion 664 of the cover member 66 projects toward the protrusion 584 provided in the gripper 58 of the lifter lever 56. When the lifter lever 56 is operated to rotate, the protrusion 584 slides on the front edge portion 664 of the cover member 66 while abutting therewith. This makes it possible to restrain wobbling of the second anteroposterior extending portion 574 and the gripper 58 with respect to the shield 60R when the lifter lever 56 is operated to rotate. Further, when the cover member 66 is attached to the lifter-lever attachment hole 63 provided in the shield 60R, the front edge portion 664 of the cover member 66 functions like a bead, so it is unnecessary to provide the bead or the like. On this account, a line appearing on an appearance is only a line of a boundary portion between the cover member 66 and the shield 60R, and a line appearing when the bead or the like is provided is not added. This makes it possible to restrain an increase in the number of lines to appear on the appearance, thereby making it possible to restrain a deterioration in an outward appearance. Further, as illustrated in FIG. 2, the protrusion 584 extends in the radial direction of the axis P. Accordingly, even if the front edge portion 664 of the cover member 66 is formed so as to extend in a curved shape slightly deviating from an arc around the axis P, it is possible to maintain a state where the protrusion 584 slides on the front edge portion 664 of the cover member 66 while abutting therewith when the lifter lever 56 is operated to rotate.

A specific embodiment has been described above, but the invention is not limited to the appearance and the configuration described in the above embodiment, and various modifications, additions, and deletions are performable as far as they do not change a gist of the invention.

For example, the present embodiment illustrates an example in which the present invention is applied to the lifter lever 56, which is an operating member of the lifter mechanism 50. However, the present invention is not limited to this, and the present invention may be applied to the recliner lever L, which is an operating member of the recliner, for example.

Further, the present embodiment deals with an example in which the front edge portion 664 of the cover member 66 is used as the projecting portion. However, the present invention is not limited to this, and the front edge portion 621 of the shield 60R may be used as the projecting portion instead of the front edge portion 664 of the cover member 66.

Further, the present embodiment illustrates an example in which the front edge portion 664 of the cover member 66 projects rightward relative to the front edge portion 621 of the shield 60R by forming the front edge portion 664 of the cover member 66 to have a thick thickness. However, the present invention is not limited to this, and the front edge portion 664 of the cover member 66 may project rightward with other structures. For example, the front edge portion 664 of the cover member 66 may be formed in a thickness that is the same as other parts of the cover member 66, and a length, in the right-left direction, of the second flange portion 626B (see FIG. 5) of the shield 60R may be formed to be shorter than the present embodiment, so that the front edge portion 664 of the cover member 66 projects rightward when the cover member 66 is fitted to the square hole portion 632.

Further, the present embodiment exemplifies a structure in which the protrusion 584 is formed integrally with the gripper 58 of the lifter lever 56. However, the present invention is not limited to this, and a protrusion as another member may be attached to the gripper 58 after the gripper 58 is formed. Further, a protrusion may be formed in the second anteroposterior extending portion 574 of the lever main body 57 of the lifter lever 56.

Further, in the present embodiment, the present invention is applied to the right side face portion of the seat cushion 10. However, the present invention is not limited to this, and the present invention may be applied to the left side face portion of the seat cushion 10, or may be applied to a front face portion or a rear face portion.

Further, in the present embodiment, the present invention is applied to a vehicle seat, but may be applied to seats to be provided in an airplane, a ship, a train, and the like.

What is claimed is:

1. A vehicle seat comprising:
   a seat cushion;
   an operating member provided in a side face portion of the seat cushion, the operating member being formed in a lever shape on which a rotation operation is performable around an axis extending in a vertical direction with respect to the side face portion;
   a shield configured to cover a base-end-side portion in a rotation operation range of the operating member, the base-end-side portion being a part of the operating member on a side close to the axis of the operating member, the shield having an opening through which the operating member is passed so as to expose a distal-end-side portion outside, the distal-end-side portion being a part of the operating member on a distant side from the axis; and
   a cover member provided in the opening so as to close part of the opening while permitting the rotation operation of the operating member, wherein:

the operating member has a protrusion projecting toward the shield, the protrusion being provided in a part opposed to the shield in the distal-end-side portion;

either one of the cover member and the shield is formed as a projecting portion projecting toward the protrusion in a part of a boundary portion between the cover member and the shield, the part of the boundary portion corresponding to the rotation operation range of the operating member; and the operating member is configured such that the protrusion slides on the projecting portion while abutting with the projecting portion when the rotation operation is performed on the operating member.

2. The vehicle seat according to claim 1, wherein:

the protrusion extends in a radial direction of the axis; and the operating member is configured such that at least part of the protrusion abuts on the projecting portion when the rotation operation is performed on the operating member.

3. The vehicle seat according to claim 2, wherein the operating member is a lifter lever configured to adjust a height position of the seat cushion with respect to a floor.

4. The vehicle seat according to claim 1, wherein the operating member is a lifter lever configured to adjust a height position of the seat cushion with respect to a floor.

\* \* \* \* \*